3,379,443
LUBRICATING ARRANGEMENT FOR DYNAMIC SELF-CONTAINED MINIMUM ENVELOPE FACE-TYPE SEAL
Jerald L. Park, Stratford, and Normand L. Lagasse, Bridgeport, Conn., assignors to Avco Corporation, Stratford, Conn., a corporation of Delaware
Filed Sept. 1, 1965, Ser. No. 484,319
4 Claims. (Cl. 277—40)

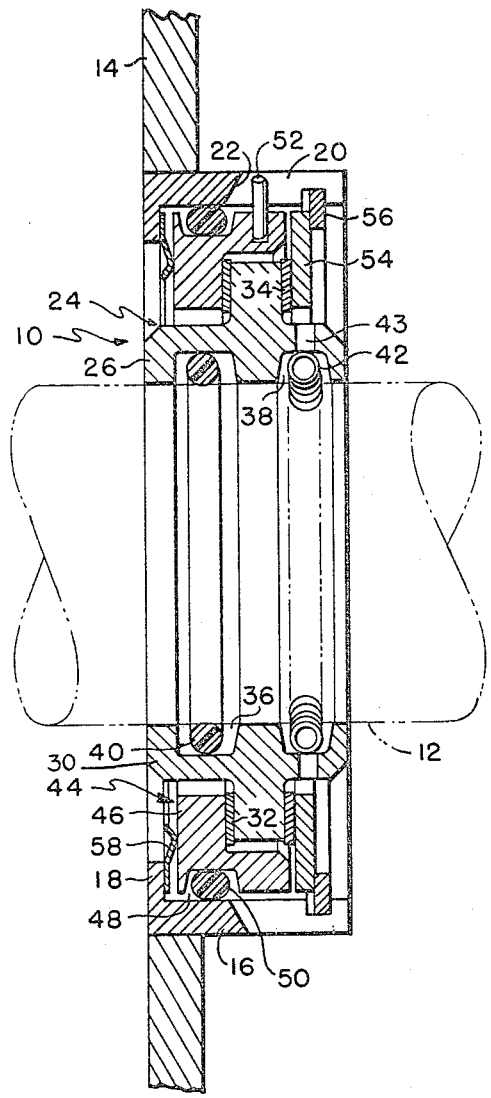

ABSTRACT OF THE DISCLOSURE

A face-type seal, having an axial length equivalent to that of a conventional lip seal, is lubricated by oil circulated through ports in the seal rotor and through slots in the seal casing, the slots and ports providing communications between the interior and exterior of the casing.

---

This invention relates to self-contained dynamic face-type shaft seals having minimum envelope size and including novel means for providing a continuous circulation of lubricating oil throughout the seal.

Two types of dynamic seals, face-type and lip-type, have been used for shaft sealing. Face-type seals have several advantages; the face contact pressure can be controlled, it has high speed capability, and it can be designed for operation under differential pressures. The primary advantage of the lip-type seal has been its relatively short axial length, and the fact that it requires no shimming or stacking up for installation. A face-type seal can be constructed with a short axial length equal to the envelope dimensions of the conventional lip seal; however, such reduced size of the face-type seal causes overheating and sludging of the lubricant.

It is an object of this invention to provide a face-type seal having the outer configuration of a lip-type seal, and in providing lubricant flow paths to achieve optimum lubricant circulation within the seal cavity for cool operation and anti-sludging.

For further objects and advantages of this invention, reference should now be made to the following detailed specification and to the accompanying drawing in which the single figure represents a preferred embodiment of this invention.

Numeral 10 generally indicates a face-type seal for sealing a shaft 12 which extends through a housing 14. The housing 14 may be the enclosure for equipment such as a motor, transmission, pump, or other similar rotating apparatus.

All of the components of the seal 10 are mounted within an annular metal casing 16 having a flange or end wall 18 at one end. For purposes which will hereinafter be described, the casing 16 is provided with a plurality of slots 20 extending axially from the other end of the casing, which is generally open. The slots 20 extend through the casing 16 and provide communication between the interior of the casing 16 and the interior of the housing 14. The slots 20 are each provided with a beveled portion 22 extending towards the end 18.

The casing 16 houses the rotor 24 having a hub 26 and a radially extending ring 30. A seal face 32 is bonded on one surface of the ring 30 while a thrust face 34 is bonded to the other surface of the ring 30. The hub 26 contains two inner peripheral grooves 36 and 38 which contain a static O-ring seal 40 and a garter-type drive spring 42. The hub 26, at the vicinity of the groove 38, contains a plurality of oil inlet ports 43.

The stator 44 of the seal includes a ring 46, the inner surface of which contacts the seal face 32 in sealing relationship. The outer periphery of the stator 44 is provided with a groove 48 for containing a static O-ring seal 50 between the casing 16 and the stator 44. The stator 44 is prevented from rotation by means of pins 52 extending through the slots 20. A thrust plate 54, retained in place by a snap ring 56, contacts the thrust face 34. The amount of pressure between the stator 44 and the seal face 32, as well as the pressure between the thrust face 34 and the thrust plate 54, is determined by a wavy washer-type spring 58 positioned between the end wall 18 and the stator 44.

In operation, rotation of the shaft 12 is transmitted to the rotor 24 through the drive spring 42 which serves as a sprag-type one-way clutch. Oil within the housing 14 (to the right of the seal as viewed in the figure) enters the seal through the ports 43 and also through the thrust plate and snap ring assemblies 54 and 56. As the rotor 24 rotates, it acts as a centrifugal pump, tending to force the oil outwardly between the thrust face 34 and thrust plate 54 and into the cavity of the casing 16. The oil is prevented from escaping out through the casing, except through the slots 20, by means of the static seal 50 and the rotating seal between the seal face 32 and the stator 44. The oil which exits through the slots 20 re-enters the housing 14 and is mixed with the remainder of the oil in the housing reservoir, and therefore a continuous circulation of oil takes place. Thus, by using the slots 20 to permit an exit for the lubricant, overheating and sludge formation, due to carbonization and polymerization, are avoided. By providing the slots 20 with a beveled portion 22 extending into the cavity, the lubricant circulation path is materially improved without affecting the structural integrity of the casing 16.

Various adaptations and modifications will at once be apparent to persons skilled in the art. It is intended, therefore, that the invention be limited only by the scope of the appended claims.

What is claimed is:
1. A dynamic face-type seal for sealing a rotating shaft, said shaft extending through an opening in a stationary housing, said seal comprising:
   a casing in said opening in sealing relationship with said housing, said shaft extending through said casing, said casing having oil outlet slots extending axially from its end within said housing toward its outer end, the interior of said casing and the interior of said housing communicating through said slots;
   a stator having a stationary annular sealing surface;
   a static seal between said stator and said casing;
   a rotor in said casing, said rotor having an annular sealing surface in running contact with the sealing surface of said stator;
   means for maintaining said sealing surfaces in running contact under pressure;
   a static seal between said shaft and said rotor; and
   a plurality of oil inlet ports in said rotor, the interiors of said housing and said casing communicating through said ports, whereby an oil flow path is established from said stationary housing through said ports, the interior of said casing, and said slots.
2. The invention as defined in claim 1, wherein said means for maintaining said sealing surfaces in contact under pressure comprises:

a stationary thrust plate retained at the inner end of said casing, said plate having an annular surface;

an annular surface on said rotor in running contact with said annular surface of said thrust plate;

a flange at the outer end of said casing; and a spring between said flange and said stator urging said stator and said rotor against said thrust plate.

3. The invention as defined in claim 2, and drive means between said shaft and said rotor for positively coupling said shaft to said rotor.

4. The invention as defined in claim 3 wherein said drive means comprises a garter-type spring surrounding said shaft and wedged between said shaft and said rotor.

References Cited

UNITED STATES PATENTS 2,756,080   7/1956   Anderson et al. _____ 277—40
3,194,342   7/1965   Heim _____ 277—1

SAMUEL ROTHBERG, *Primary Examiner.*